United States Patent
Muthukrishnan et al.

(10) Patent No.: US 11,599,883 B2
(45) Date of Patent: Mar. 7, 2023

(54) SYSTEM AND METHOD FOR FRAUD RISK ANALYSIS IN IOT

(71) Applicant: Visa International Service Association, San Francisco, CA (US)

(72) Inventors: Ravi Krishnan Muthukrishnan, Bangalore (IN); Prakash Kalaiah, Fremont, CA (US); Subramanian Kumaraswamy, Cupertino, CA (US)

(73) Assignee: Visa International Service Association, San Francisco, CA (US)

(*) Notice: Subject to any disclaimer, the term of this patent is extended or adjusted under 35 U.S.C. 154(b) by 388 days.

(21) Appl. No.: 16/484,941

(22) PCT Filed: Mar. 8, 2017

(86) PCT No.: PCT/US2017/021432
§ 371 (c)(1),
(2) Date: Aug. 9, 2019

(87) PCT Pub. No.: WO2018/164684
PCT Pub. Date: Sep. 13, 2018

(65) Prior Publication Data
US 2019/0364426 A1    Nov. 28, 2019

(51) Int. Cl.
*G06Q 20/40* (2012.01)
*B60R 13/10* (2006.01)
(Continued)

(52) U.S. Cl.
CPC ......... *G06Q 20/4016* (2013.01); *B60R 13/10* (2013.01); *G01C 22/00* (2013.01);
(Continued)

(58) Field of Classification Search
None
See application file for complete search history.

(56) References Cited

U.S. PATENT DOCUMENTS

2004/0167861 A1    8/2004  Hedley
2011/0047009 A1    2/2011  Deitiker et al.
(Continued)

FOREIGN PATENT DOCUMENTS

| CN | 107835174 A | * | 3/2018 |
| EP | 3035268 | | 6/2016 |
| WO | 2006134498 | | 12/2006 |

OTHER PUBLICATIONS

Miettinen et al. IoT Sentinel: Automated Device-Type Identification for Security Enforcement in IoT. Date: Dec. 13, 2016. https://arxiv.org/pdf/1611.04880.pdf. (Year: 2016).*

(Continued)

*Primary Examiner* — Patricia H Munson
*Assistant Examiner* — Nancy N Prasad
(74) *Attorney, Agent, or Firm* — Kilpatrick Townsend & Stockton LLP

(57) ABSTRACT

Embodiments of the disclosure are directed to methods, systems, and devices for the use of portable devices, such as a vehicle driven by a user, that are distinctive physical objects and can be presented to an authentication system for authentication purposes. More specifically, the portable device may be used as a source of information for the authentication system that can be verified. Images may be captured of the portable devices in order to determine their distinctive features for comparison to other physical objects registered to the user. The portable devices may also be a source of metadata, or additional contextual information associated with those portable devices or their interaction with the authentication system. The image data and/or the metadata associated with a portable device can be verified for fraud or risk analysis.

20 Claims, 8 Drawing Sheets

(51) Int. Cl.
*G01C 22/00* (2006.01)
*G06Q 10/0635* (2023.01)
*G06Q 20/36* (2012.01)
*H04W 12/06* (2021.01)

(52) U.S. Cl.
CPC ..... *G06Q 10/0635* (2013.01); *G06Q 20/3674* (2013.01); *H04W 12/06* (2013.01); *G06T 2200/04* (2013.01)

(56) References Cited

U.S. PATENT DOCUMENTS

| | | |
|---|---|---|
| 2013/0204719 A1 | 8/2013 | Burry et al. |
| 2013/0339247 A1 | 12/2013 | Lam et al. |
| 2015/0348019 A1* | 12/2015 | Faith .................... G06Q 20/382 705/44 |
| 2016/0171477 A1 | 6/2016 | Elder et al. |
| 2016/0234633 A1* | 8/2016 | Huang .................... H04L 67/12 |
| 2016/0247143 A1* | 8/2016 | Ghosh ................ G06Q 20/3278 |
| 2016/0371853 A1* | 12/2016 | Holz ................. G02B 27/0172 |

OTHER PUBLICATIONS

EP17899258.2, "Extended European Search Report", dated Jan. 2, 2020, 11 pages.
International Search Report, dated Dec. 8, 2017, in International Application No. PCT/US2017/021432, 14 pages.

\* cited by examiner

SYSTEM AND METHOD FOR FRAUD RISK ANALYSIS IN IOT

CROSS-REFERENCES TO RELATED APPLICATIONS

This application is the U.S. National Phase of PCT Application No. PCT/US2017/021432, filed Mar. 8, 2017, the disclosure of which is incorporated by reference.

FIELD

Methods and systems disclosed herein relate generally to authentication and the fraud or risk analysis performed in connection with authentication. More specifically, the methods and systems disclosed herein can be used in order to improve security against fraud through the use of distinctive physical objects that are portable and can be presented for authentication purposes. Images may be captured of those physical objects in order to determine their distinctive features. The physical objects may also be a source of metadata, or extra contextual information associated with those physical objects. The image data and/or the metadata associated with a physical object can be verified for fraud or risk analysis.

BACKGROUND

In today's technological environment, a user may interact with a variety of computer systems to achieve specific tasks or obtain specific resources. For example, on any given day, a user might interact with a first computer system to gain entry into a train terminal, a second computer system to access his or her office building, a third computer system to log onto his or her employers network, and a fourth computer system to purchase coffee. To interact with each of these computer systems, a user may need to remember specific credentials (e.g. username and password) or carry around entry cards storing credentials (e.g. train pass, credit card, etc.). The credentials are usually required by the various computer systems to authorize access to the user, and are typically managed and stored in a dedicated database specific to the individual computer system for which they were issued. However, this may enable fraudulent interactions where another user steals the specific credentials (or cards storing credentials) in order to obtain access to the various computer systems.

To deal with this issue, tokens are frequently used in order to serve as a surrogate. For example, a token may refer to, or be associated with, a personal account number used to identify a user. Even if the token is somehow compromised (e.g., another user steals the token), the underlying accounts or credentials will not be compromised. However, the use of tokens obfuscates the underlying account information and makes it difficult to perform traditional fraud or risk analysis. Accordingly, there exists a need for contextual information associated with the token to be passed to these various computer systems for enabling fraud or risk analysis to be performed.

Embodiments of the invention address this and other problems, individually and collectively.

BRIEF SUMMARY

In some embodiments of the present disclosure, a computer-implemented method is disclosed herein that comprises: receiving, by an access device, a transaction request from a portable device to initiate a transaction, the transaction request comprising an account identifier associated with a user account associated with the portable device; receiving, by the access device, an image of the portable device; determining, by the access device, image data for the image of the portable device; and providing, by the access device, the image data and the account identifier to a transaction processing computer, wherein the transaction processing computer verifies the image data, wherein the transaction processing computer thereafter transmits an authorization request message to an authorizing computer, wherein the authorizing computer authorizes or does not authorize the transaction.

In some embodiments of the present disclosure, an access device is disclosed herein that comprises: a processor; a network interface; and a non-transitory computer-readable memory storing a set of instructions configured to be executed to instruct the processor to: receive a transaction request from a portable device to initiate a transaction, the transaction request comprising an account identifier associated with a user account associated with the portable device; receive an image of the portable device; determine image data for the image of the portable device; and provide the image data and the account identifier to a transaction processing computer, wherein the transaction processing computer verifies the image data, and wherein the transaction processing computer thereafter transmits an authorization request message to an authorizing computer, wherein the authorizing computer authorizes or does not authorize the transaction.

In certain embodiments, the image data comprises 3D image data. In certain embodiments, the access device comprises a camera configured to capture the image of the portable device. In certain embodiments, the portable device is a vehicle. In certain embodiments, the computer-implemented method may further comprise: receiving, by the access device, a set of metadata associated with the vehicle, wherein the set of metadata associated with the vehicle includes one or more of: a license plate number, a vehicle identification number (VIN), a number of miles the vehicle has been driven, and a timestamp; and providing, by the access device, the set of metadata to the transaction processing computer, wherein the transaction processing computer further verifies the set of metadata. In certain embodiments, the account identifier is a token. In certain embodiments, the image data for the image of the portable device comprises a set of 3D planar cross-sections. In certain embodiments, the access device comprises a sensor configured to interface with the portable device to obtain a metadata item associated with the portable device.

In some embodiments of the present disclosure, a computer-implemented method is disclosed herein that comprises: receiving, by a transaction processing computer, a set of data associated with a transaction, wherein the set data associated with the transaction includes: image data for an image of a portable device; an account identifier associated with a user account associated with the portable device; and a set of metadata associated with the portable device. The computer-implemented method may further comprise: verifying, by the transaction processing computer, the image data for the image of the portable device by comparing it to image data for an image of a physical object registered to the user account; verifying, by the transaction processing computer, the set of metadata associated with the portable device by comparing it to a set of metadata associated with the physical object registered to the user account; determining, by the transaction processing computer, a risk score at least partly based on both the verification of the image data for the image image of the portable device and the verification of the set of metadata associated with the portable device; and transmitting, by the transaction processing computer; an authorization request message containing the risk score to an authorizing computer, wherein the authorizing computer authorizes or does not authorize the transaction.

In certain embodiments, the portable device is a vehicle. In certain embodiments, the physical object registered to the user account is a vehicle. In certain embodiments, the account identifier is a token.

DETAILED DESCRIPTION

Introduction

Figure 1:
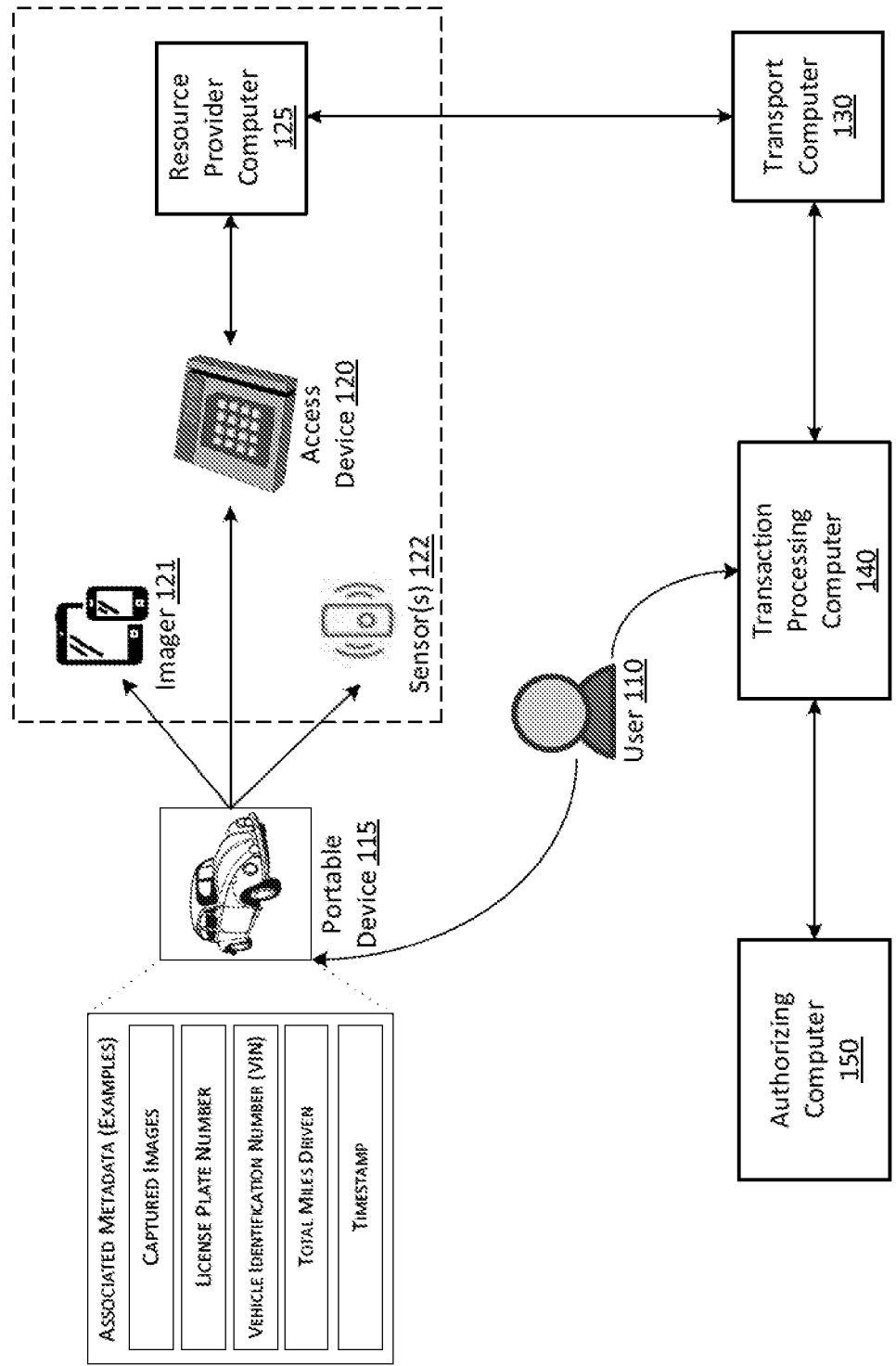
FIG. 1 shows a system diagram of an authorization system according to embodiments of the invention.

As previously discussed, tokens are frequently used in order to serve as a surrogate in transactions. However, the use of tokens obfuscates the underlying account information and makes it difficult to perform traditional fraud or risk analysis.

In order to allow for a surrogate while enable fraud or risk analysis, a physical object having distinctive features can be used. A user can register that physical object with a transaction network by supplying images of the object, as well as any distinctive metadata associated with that object, to the network. This information for that physical object can be associated with the user.

In order to initiate a transaction, the user having possession of the physical object can bring it to the transaction. Images of the object can be taken and any metadata for the object can be collected. This information can be compared to the information on-file for the user that was collected during the registration process. This contextual information can be used in order to ascertain whether the physical object used in the transaction is the same as the physical object registered by the user, which can be determinative of whether the transaction is fraudulent.

Terms and Definitions

Prior to discussing the details of some embodiments of the present invention, description of some terms may be helpful in understanding the various embodiments.

A "user device" may comprise a device that may be used by a user. A user device may comprise of elements such as a display, a processor, a memory, an input device, and a network interface. Examples of a user device may include mobile devices, personal computing devices (e.g. desktop computers, laptop computers, or tablet computers), etc.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private, network. Examples of mobile devices include mobile phones (e.g., cellular phones), PDAs, tablet computers, net books, laptop computers, personal music players, hand-held specialized readers, wearable devices (e.g., watches, glasses, lenses, tattoos, clothing, etc.), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

A "portable device" may be a device that is portable. A portable device may, for example, be used to conduct a transaction. A portable device may include a storage technology (e.g., electronic memory, magnetic stripe, etc.) to store credentials or tokens associated with an account of a user. A portable device can be in any of the forms described above with respect to the mobile device, or in the form of a card (e.g., integrated chip card, magnetic stripe card) or a fob, etc. In some embodiments, the portable device and the mobile device may be the same device, and need not be separate devices. In some embodiments, the portable device may have unique features and/or metadata associated with it that may be used to conduct a transaction. For example, in some embodiments, the portable device may be a vehicle that is associated with a license plate number, a vehicle identification number (VIN), and so forth. That type of information can be passed along as metadata in order to conduct a transaction. In some embodiments, the portable device may be a physical object; as disclosed herein, the terms "portable device" and "physical object" are sometimes used interchangeably. Specific examples of portable devices can include wearable devices, payment cards such as credit, debit, and prepaid cards, vehicles with remote communication capabilities, rings, etc.

A "server computer" may include a powerful computer or cluster of computers. For example, the server computer can be a large mainframe, a minicomputer cluster, or a group of servers functioning as a unit. In one example, a server computer may be a database server coupled to a Web server. A server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be computer code or other data stored on a computer readable medium (e.g. memory element or secure element) that may be executable by a processor to complete a task.

A "resource provider" may be an entity that can provide a resource such as goods, services, information, and/or access. Examples of a resource provider includes merchants, data providers such as government agencies, transit agencies, etc. A "merchant" may typically be an entity that engages in transactions and can sell goods or services, or provide access to goods or services.

A "resource provider computer" may be a computer operated by a resource provider. Suitable computers may include access devices, back end server computers, as well as combinations of the above.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRB), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RE) antennas, optical scanners, bar code readers, or magnetic stripe readers to interact with a portable communication device. In some embodiments, an access device may include an imager, a component used to capture 2D/3D images of a physical object and metadata associated with the physical object that can be determined from the image (e.g., a serial number on the object). In some embodiments, an access device may include one or more sensors used to capture metadata associated with a physical object. For example, the physical object may be configured to transmit, via a wireless electronic communication, a unique number associated with the physical object. The sensor may be a transceiver configured to receive that wireless electronic communication containing the unique number, or any other metadata encapsulate in the communication. In some embodiments, the components of the access device may be in a singular device, whereas in other embodiments, the components of the access device may be in separate devices. For example, the access device may include both a POS terminal and a mobile device; the mobile device may have the imager used to capture images on behalf of the POS terminal. Some examples of the imager include a camera, such as the cameras found in mobile devices such as smartphones, Google Glass, and so forth.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. Other standard message formats may include ISO 20022 as well as blockchain message format. The authorization request message may include information that can be used to identify an account (e.g., information for a token). An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc. In some embodiments, the authorization request message may include images, metadata, or contextual data associated with a physical object. For example, if the physical object is a vehicle, the authorization request message may include images of the vehicle as well as metadata associated with that particular vehicle, such as a license plate number or a vehicle identification number, and so forth.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "payment credential" may include any suitable credential that can be used to conduct a payment transaction. Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier.

An "account identifier" may include any suitable label for an account. The account identifier may be in any suitable form and may include any suitable types of characters. Examples of account identifiers include PANs (primary account numbers), tokens, verification values such as CVVs, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

An "account identifier" may include an identifier for an account. An account identifier may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "resource provider identifier" can include any suitable type of information that can identify a resource provider or a location of a resource provider. Examples of resource provider identifiers may include a merchant ID, a store ID, a device ID of a device at a resource provider location, etc.

Figures

FIG. 1 shows a block diagram of an authorization system according to embodiments of the invention. System 100 may include an access device 120 for interacting with portable device 115. Various portable devices are contemplated and any suitable object with sufficient portability and distinctive features may be used. However, in some embodiments, the portable device 115 may be a vehicle as shown in the figure.

In some embodiments, the user 110 may seek to initiate a transaction by bringing the portable device 115 to the access device 120. The transaction may be a purchase of goods or services, a request to access a building, an inquiry for sensitive information, etc. In some embodiments, the portable device 115 may be a vehicle and the user 110 may present the portable device 115 to a resource provider by driving the vehicle up to the vicinity of the access device 120.

In some embodiments, the portable device 115 may be able to provide a token of a credential of user 110 to the access device 120. The access device 120 may be able to transmit and receive data to and from portable device 115 using any number of communication methods supported by access device 120 and portable device 115 such as near-field communications, Bluetooth, internet protocol, etc. In some embodiments, the portable device 115 may have distinctive features associated with it that can be captured using an imager 121 and other sensors 122 of the access device 120.

For example, in some embodiments, the portable device 115 may be a vehicle with remote communication capabilities that is configured to provide a token of a credential of user 110 to the access device 120. The access device 120 may have an imager 121 for taking an image of the vehicle, which may be used to provide additional data for authentication in order to conduct a transaction. Furthermore, the vehicle may be able to transmit additional contextual information or metadata associated with the vehicle, such as: a license plate number, a vehicle identification number (VIN), the number of total miles driven with the vehicle, a timestamp associated with any of those readings (e.g., a timestamp associated with snapshot of the number of total miles driven with the vehicle), and so forth. In some embodiments, the access device 120 may have one or more sensors 122 configured to collect this metadata if the vehicle is not configured to transmit that information directly to the access device 120. In some embodiments, the imager 121 or sensors 122 may be part of the access device 120. In some embodiments, the imager 121 and/or the sensors 122 may be separate from the access device 120. For instance, the imager 121 may be a camera on the user's mobile device. Once the user captures the image with their mobile device, they can send or upload the image to the access device 120.

Access device 120 may be a device that is coupled to resource provider computer 125 in this example. In other examples, the access device 120 may be a resource provider computer, or the access device 120 in combination with the resource provider computer 125 may constitute a "resource provider computer." Accordingly, the imager 121, the sensors 122, the access device 120, and the resource provider computer 125 are shown within a dashed box in the figure to represent that these components may be grouped together, although any of these components may be separate from the others. Resource provider computer 125 may be configured to generate, send, and receive authorization messages based on interactions with user 110. System 100 may further comprise transport computer 130 configured to receive and forward authorization messages, transaction processing computer 140 configured to process transaction data, and authorizing computer 150 configured to determine authorization decisions or authorization results.

In order to conduct the transaction, the resource provider may request user 110 to transmit his or her credentials, along with other relevant transaction data, through the access device 120. For example, the resource provider may be a merchant that requests user 110 move the portable device 115 (e.g., a vehicle) into the vicinity of the access device 120. In some embodiments, the credentials of user 110 may be stored on the portable device 115 in the form of a token or an account identifier that identifies an account of the user. One example of an account identifier may be a primary account number (PAN). According to embodiments of the invention, the portable device 115 may transmit credentials instantly to access device 120 after establishing a connection. Access device 120 may receive the credentials from portable device 115 and may transmit the credentials to resource provider computer 125.

In some embodiments, the access device 120 may collect other relevant transaction data. For example, in some embodiments, the portable device 115 may be a vehicle having distinctive features (e.g., make, model, dimensions). The access device 120 may take a 2D or 3D image of the vehicle and transmit it to resource provider computer 125, The vehicle may also have additional metadata associated with it, such as a license plate, number, a vehicle identification number (VIN), the number of total miles driven with the vehicle, and so forth. The vehicle may transmit that metadata to the access device 120 through the established connection, or the access device 120 may have one or more sensors 122 configured to obtain that information from the vehicle (e.g., a device capable of interfacing with the vehicle's OBD II port). All of that metadata may be transmitted by the access device 120, along with a timestamp associated with those readings, to the resource provider computer 125.

In one embodiment, resource provider computer 125 may use the received credentials to generate an authorization request message. The authorization request message may comprise the credentials or account identifier of user 110 and a resource provider identifier identifying the resource provider or resource provider computer. For example, the resource provider identifier may be a merchant ID identifying computers and systems of a merchant that conducts transactions with users. In addition, the authorization request message may also include images, metadata, or contextual data associated with the portable device 115. For example, if the portable device 115 is a vehicle, the authorization request message may include images taken of the vehicle. The authorization request message could also include metadata associated with that particular vehicle, such as the vehicle's license plate number, VIN, total miles driven, and so forth.

Once the authorization request message has been generated, resource provider computer 125 may send the message to transport computer 130. Transport computer 130 may be any computer for receiving and forwarding authorization messages according to embodiments of the invention. In one embodiment, transport computer 130 may be a computer of an acquiring entity that enables a resource provider to conduct specific types of transactions.

Transport computer 130 may receive the authorization request message from resource provider computer 125 and may forward the message to transaction processing computer 140. Transaction processing computer 140 may be any computer or server computer for processing transactions according to embodiments of the invention. For example, transaction processing computer 140 may be a computer of a payment processing network, such as VisaNet, and may be configured to receive, read, analyze, store, and retrieve transaction data as well as determine appropriate actions based on predetermined logic. In one embodiment, transaction processing computer 140 may read the information stored in the received authorization request message (e.g., the images and metadata associated with the portable device 115) and may analyze that information in order to determine whether the portable device 115 is a physical object that was previously registered and associated with the user 110.

According to embodiments of the invention, transaction processing computer 140 may determine, based on the data in the authorization request message, an authorizing entity computer or authorizing computer 150 associated with user 110. For example, transaction processing computer 140 may read the account identifier and may determine that the first six digits of the account identifier comprises an issuer identification number (IIN) specifying an authorizing system associated with user 110 or user 110's credentials. In one embodiment, authorizing computer 150 may be a computer of an issuing entity that issues credentials and/or portable device 115 to user 110 such as a bank, government agency, security network, etc. Upon determination of the authorizing entity computer, transaction processing computer may determine an address of authorizing computer 150, so that the authorization request message can be routed to authorizing computer 150 for authorization of the transaction.

Transaction processing computer 140 may send the authorization request message to authorizing computer 150, and authorizing computer 150 may receive the authorization request message to determine an authorization result based on the data contained therein. For example, the data may comprise an account identifier or PAN that is associated with an availability of funds or credit that may be compared to a transaction amount. Authorizing computer 150 may evaluate the received data and determine art authorization result of "approve" or "decline." The authorization result may be used to generate an authorization response message that may be sent back to transaction processing computer 140. Transaction processing computer 140 may receive the authorization response message and may send the message to transport computer 130. Transport computer 130 may then forward the authorization response message to resource provider computer 125 so that the resource provider may determine an action based on the authorization result contained therein.

In another embodiment, transaction processing computer 140 may indicate a verification status in the authorization request message prior to sending the message to an authorizing computer 150. For example, the transaction processing computer 140 may modify the authorization request message with the verification status, which may potentially influence the authorization result determined by authorizing computer 150. For example, the transaction processing computer 140 may analyze the images and/or metadata associated with the portable device 115 and determine that the portable device 115 is likely the same physical object that was previously registered by the user 110. This registration may have taken place between the user 110 and the transaction processing computer 140. The verification status may indicate that the transaction is less likely to be fraudulent, since the same physical object was used, and should be approved by the authorizing computer 150. In another example, the transaction processing computer 140 may analyze the images and/or metadata associated with the portable device 115 and determine that the portable device 115 is likely not to be the physical object that was registered by the user 110. The transaction processing computer 140 may then indicate through the verification status that the transaction is more likely to be fraudulent. Thus, the authorizing computer 150 may take into account the verification status in determining an authorization result. Once the authorizing computer 150 determines an authorization result, the authorizing computer 150 may then send the authorization result to transaction processing computer 150 in an authorization response message, which may be forwarded to the resource provider computer 125.

In some embodiments, resource provider computer 125 may execute logic based on the contents of the authorization response message forwarded by the transaction processing computer 150. For example, if the authorizing computer 150 determined an authorization result of "approve", that authorization result would be communicated in the authorization response message. Once the resource provider computer 125 receives that authorization response message, it may lead the resource provider computer 125 to execute logic for indicating to user 110 that the transaction has been authorized and has gone through. Alternatively, if the authorizing computer 150 determined an authorization result of "decline", once the resource provider computer 125 receives that authorization response message, it may lead the resource provider computer 125 to execute logic for indicating to user 110 that the transaction has been declined. In some cases, the resource provider computer 125 may also inform the user why the authorizing computer 150 declined the transaction (e.g., the image taken of the portable device 115 was of poor quality). This reason may be indicated in the authorization response message. By informing the user 110 that the transaction was declined, the user 110 may attempt to repeat the transaction again after fixing the issue that was indicated by the authorization response message (e.g., the user may reposition the portable device 115 for the access device 120 to capture a better quality image).

At the end of the day or at some other period of time after the entities of system 110 have responded and taken appropriate action based on the authorization result and/or determined recurrence value, a clearing and settlement process can take place and the interaction may be officially recorded. For example, after predetermined logic has been executed by transaction processing computer 140 or by resource provider computer 125, an allocation of funds may be facilitated between an issuer of authorizing computer 150, a payment processing network of transaction processing computer 140, an acquirer of transport computer 130, and a resource provider of resource provider computer 125. The allocation of funds may be accounted for by storing data relating to the interaction or transaction in one or more secure databases.

Figure 2:
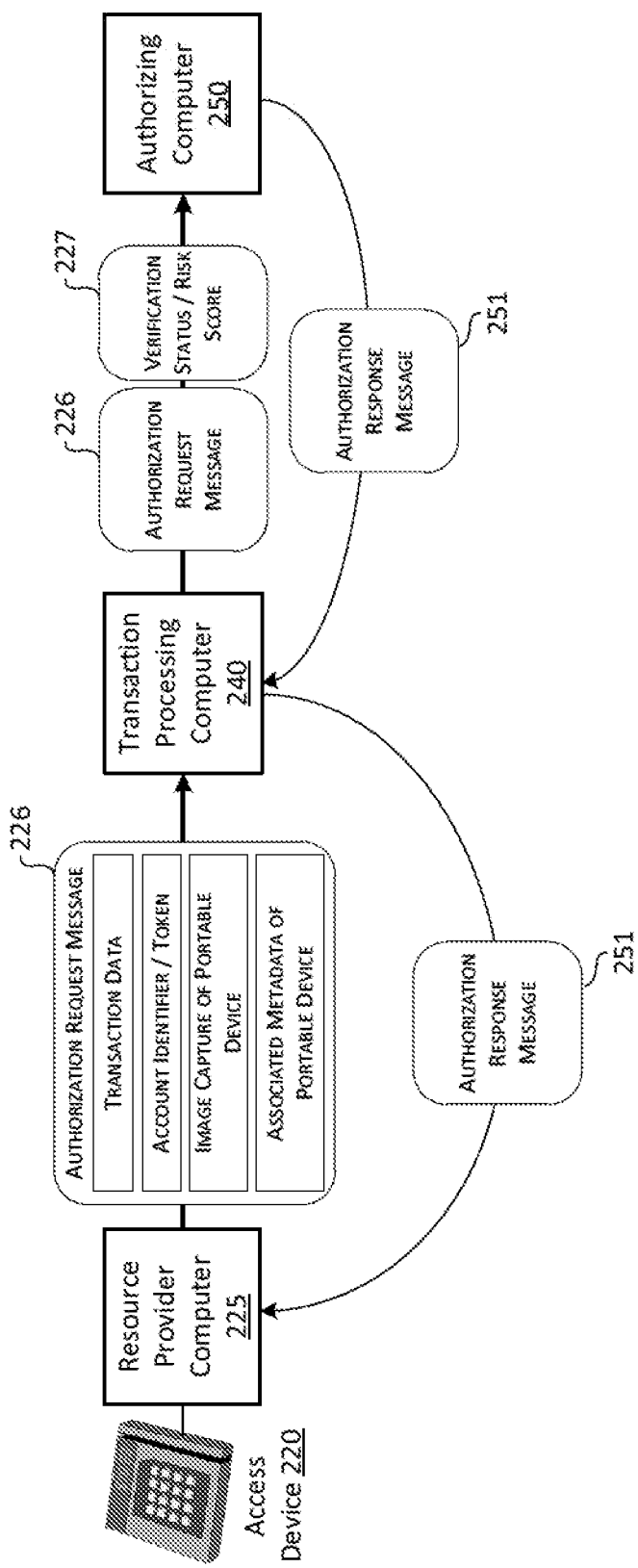
FIG. 2 shows a data flow diagram illustrating the communication between components of an authorization system according to embodiments of the invention.

FIG. 2 shows a data flow diagram illustrating the communication between components of an authorization system according to embodiments of the invention.

As previously mentioned, the user may present a portable device to the access device 220 and/or the resource provider computer 225 in order to initiate a transaction. Although the access device 220 and the resource provider computer 225 are shown separately in the figure, in some embodiments they may be the same. As previously described, the access device 220 and the resource provider computer 225 may collect transaction data to be sent to the transaction processing computer 240. In some embodiments, the resource provider computer 225 may transmit an authorization request message 226 to the transaction processing computer 240. The authorization request message 226 may include transaction data, which may include an account identifier or token, any image captures of the portable device, and any metadata associated with the portable device.

The transaction processing computer 240 may interpret the authorization request message 226 and compare contextual information for the portable device to any information on-file for physical objects registered to the user, based on the image captures and/or metadata of the portable device. In other words, the transaction processing computer 240 may determine how likely the portable device matches one of the physical objects registered to the user. Various methods can be used to make this determination and some are provided in the disclosure. For example, features of the portable device gleaned from the image captures can be compared to features of any registered physical objects. The metadata of the portable device can also be compared to the metadata for any registered physical objects, in order to determine that there is a match between the metadata or that any changes in the metadata make logical sense. The transaction processing computer 240 will make these determinations and generate a verification status or risk score, which may be indicative of the degree of the match or how likely the transaction is to be fraudulent.

The transaction processing computer 240 may then forward the authorization request message 226 to the authorizing computer 250, along with the verification status/risk score 227 that was determined. The authorizing computer 250 may interpret the contents of the authorization request message 226, as well as the verification status/risk score 227, in order to make a determination on whether the transaction is authorized. That decision may be sent back to the transaction processing computer 240 in an authorization response message 251. If the transaction is not authorized, the authorizing computer 250 may also send in the authorization response message 251 any reasons for not authorizing the transaction. The transaction processing computer 240 may then forward the authorization response message 251 to the resource provider computer 225, which may then notify the user whether the transaction was successful or why the transaction was not successful.

Figure 3:
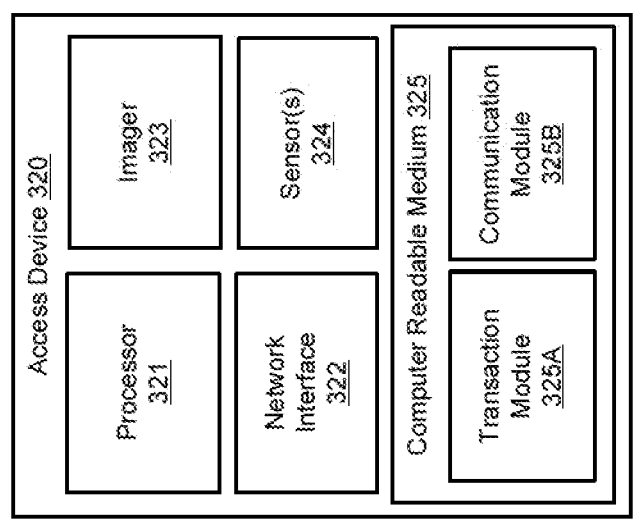
FIG. 3 shows a block diagram of an access device according to embodiments of the invention.

FIG. 3 shows a block diagram of an access device according to an embodiment of the invention. The access device 320 may be any suitable device for providing access to an external computer system, such as the access device 120 of FIG. 1. Some examples for the access device 320 may include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. In some embodiments, the access device 320 may comprise a POS terminal, which may include a reader, a processor, and a computer-readable medium. In some embodiments, the access device 320 may include two or more physical devices, and the components of access device 320 shown in the figure may be spread across those physical devices. For example, the access device 320 may include a POS terminal as well as a mobile smart phone having an integrated camera. The mobile phone may be used to capture images (e.g., perform the functionality of the imager 323) and provide those images to the POS terminal.

In some embodiments, the access device 320 may comprise a processor 321 for executing instructions or logic, a network interface 322 for sending and receiving messages over a network, and computer readable medium 325 for storing instructions or modules that may be executed by processor 321 to perform tasks and methods according to embodiments of the invention. The instructions or modules may be in the form of code stored in an application or of an application programming interface (API).

Regarding the network interface 322, the access device 320 may use any suitable contact or contactless modes of operation to send or receive data from, or associated with, the portable device 115 and/or the resource provider computer 125. For example, the access device 320 may be configured to communicate with the portable device 115 using near-field communications, Bluetooth, local area network, internet protocol, etc. The access device 320 may also be configured to communicate with the resource provider computer 125, such as through near-field communication, Bluetooth, local area network, internet protocol, etc. Accordingly, the network interface 322 may include a chip or components configured to send and receive communications using such methods. In some embodiments, the portable device 115 may be able to transmit to the access device 320 a credential associated with the user and/or metadata associated with the portable device 115, to be used in the transaction process. For example, in embodiments where the portable device 115 is a vehicle, the vehicle may transmit the VIN or a number of miles driven on the vehicle to the network interface 322 of the access device 320.

In some embodiments, the access device 320 may also include an imager 323 and/or sensors 324. The imager may be any suitable component capable of taking 2D and/or 3D images of a physical object. These images may be used to generate a 3D mapping of the physical object, such as the portable device 115 (e.g., a vehicle). In some embodiments, the use of 3D images may be faster than the use of 2D images for verification purposes. Furthermore, the use of 3D images may provide more data points than 2D images, which allows for stronger verification (e.g., performed by the transaction processing computer 140). The sensors 324 may include one or more sensors used to capture metadata associated with a physical object, such as the portable device 115. For example, if the portable device 115 is a vehicle that is incapable of transmitting metadata directly to the access device 320, the sensors 324 may be able to collect that metadata from the vehicle. As a more specific example, not all modern vehicles have connected car capabilities, but all modern vehicles have a ODB-II port that is commonly used to diagnose problems with the vehicle. One of the sensors 324 may be configured to interface with the ODB-II port of a vehicle in order to obtain the vehicle identification number associated with the vehicle. Alternatively, one of the sensors 324 may be an imaging device capable of capturing an image of the vehicle identification number stamped on the vehicle, such as a VIN displayed under the hood of the vehicle.

In some embodiments, the computer readable medium 325 may comprise transaction module 325A for instructing processor 321 to generate transaction data comprising information about a transaction (e.g. transaction amount, product data, images, metadata, etc.). For example, the transaction module 325 may instruct the processor 321 to use the imager 323 and the sensors 324 to collect the images and metadata associated with a physical object, such as portable device 115. In one embodiment, the metadata may include a timestamp specifying the time of collection of the metadata (e.g., a time indicating when a snapshot of the total miles driven using a vehicle was taken). In some embodiments, the transaction data may also comprise a transaction timestamp specifying the time and date of the transaction, as well as a transaction ID which may be recorded and later be used to identify the transaction that takes place.

In some embodiments, the computer readable medium 325 may further comprise communications module 325B for instructing processor 321 to receive, format, and transmit data and/or messages over network interface 322 during a transaction. For example, communication module 325B may comprise code for sending transaction data generated or collected (e.g., through the transaction module 325A) to the resource provider computer 125 shown in FIG. 1.

Figure 4:
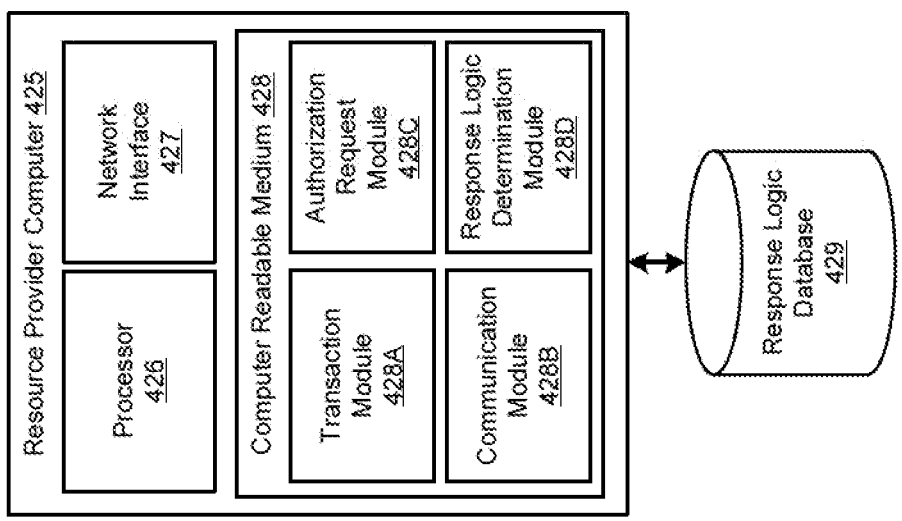
FIG. 4 shows a block diagram of a resource provider computer according to an embodiment of the invention.

FIG. 4 shows a block diagram of a resource provider computer according to an embodiment of the invention. Resource provider computer 425 may be any computer, device, or server computer configured to conduct transactions between a resource provider and a user, such as resource provider computer 125 of FIG. 1. Resource provider 425 may comprise a processor 426 for executing instructions or logic, a network interface 427 for sending and receiving messages over a network, and computer readable medium 428 for storing instructions or modules that may be executed by processor 426 to perform tasks and methods according to embodiments, of the invention. The instructions or modules may be in the form of code stored in an application or of an application programming interface (API).

Computer readable medium 428 may comprise transaction module 428A for instructing processor 426 to generate or collect transaction data comprising information about transaction (e.g. transaction amount, product data, images, metadata, etc.). In one embodiment, the transaction data may also comprise a transaction timestamp specifying the time and date of the transaction, as well as a transaction ID which may be recorded and later be used to identify the transaction that takes place.

Computer readable medium 428 may further comprise communication module 428B for instructing processor 426 to receive, format, and transmit data and/or messages over network interface 427 during a transaction. For example, communication module 428 may comprise code for formatting and sending an authorization request message and for receiving and reformatting an authorization response message. In some embodiments, the communication module 428B may be used to facilitate communications between the resource provider computer 125 and the transaction processing computer 140 shown in FIG. 1, by formatting the communication into an interpretable form for transaction processing computer 140.

Computer readable medium 428 may comprise authorization request module 428C for generating an authorization request message according to embodiments of the invention. The authorization request message may comprise the transaction data, an account identifier of a user, the images and metadata associated with the portable device, a resource provider identifier of a resource provider, and so forth. The resource provider identifier may be a merchant ID identifying the resource provider or resource provider computer that generated the authorization request message and may also be associated with a resource provider category or merchant category code. A category code may be a code designated to specific resource provider computer systems that share similar characteristics. For example, a merchant category code (MCC) may be equal to '4112,' which may indicate that resource provider computer 425 belongs to a category of computer systems that share the characteristics of, or have been designated as, 'passenger railways.'

Computer readable medium 428 may further comprise response logic determination module 428D for determining logic to execute based on a received authorization response message forwarded by the transaction processing computer 140. Response logic may be predetermined and stored on or managed by resource provider computer 425. For example, resource provider computer 425 may be configured with an application program interface (API) comprising instructions that executes response logic upon receiving a response, such as from a transaction processing computer 140.

Response logic may be stored in a memory of resource provider computer such as random-access memory (RAM) or application memory or may be stored in an external memory or separate database such as response logic database 429. For example, the resource provider computer 425 may receive a denial of the transaction that is linked to logic instruction the resource provider computer 425 to notify the user that the transaction has been denied. In another example, resource provider computer 425 may be a merchant computer that is configured to receive a response and, based on the response, display a message instructing or informing a merchant employee to initiate a custom interaction with user 110 (e.g. 'have the user reposition the portable device so additional images may be taken of it').

Response logic that is stored or accessible by resource provider computer 425 may comprise any set of logical statements which define one or more actions to execute based on a received response. The logical statements may be defined for different responses received from the transaction processing computer 140. For example, resource provider computer 425 may generate an authorization request message requesting an authorization of a transaction. The authorization request message may include transaction data, including the images and/or metadata associated with the portable device 115 presented to the access device 120. A transaction processing computer, such transaction processing computer 140 of FIG. 1, may receive the request message and may perform an analysis of the message. For instance, the transaction processing computer 140 may take the images and/or metadata associated with the portable device 115 and perform analysis in order to determine whether the portable device 115 is the physical object that the user 110 registered with the transaction processing computer 140. The resource provider computer 425 may then receive a response from the transaction processing computer (e.g., forwarded from the authorizing computer), and the associated logical statement with the response may be followed. For instance, the response may indicate that the authorization was successful and the associated logical statement may instruct the resource provider computer 425 to inform the user 110 that the transaction was successful. Any number of logical statements may be predetermined and/or programmed onto resource provider computer 425, which may be used to customize interactions with a user based on the results of the authorization.

Figure 5:
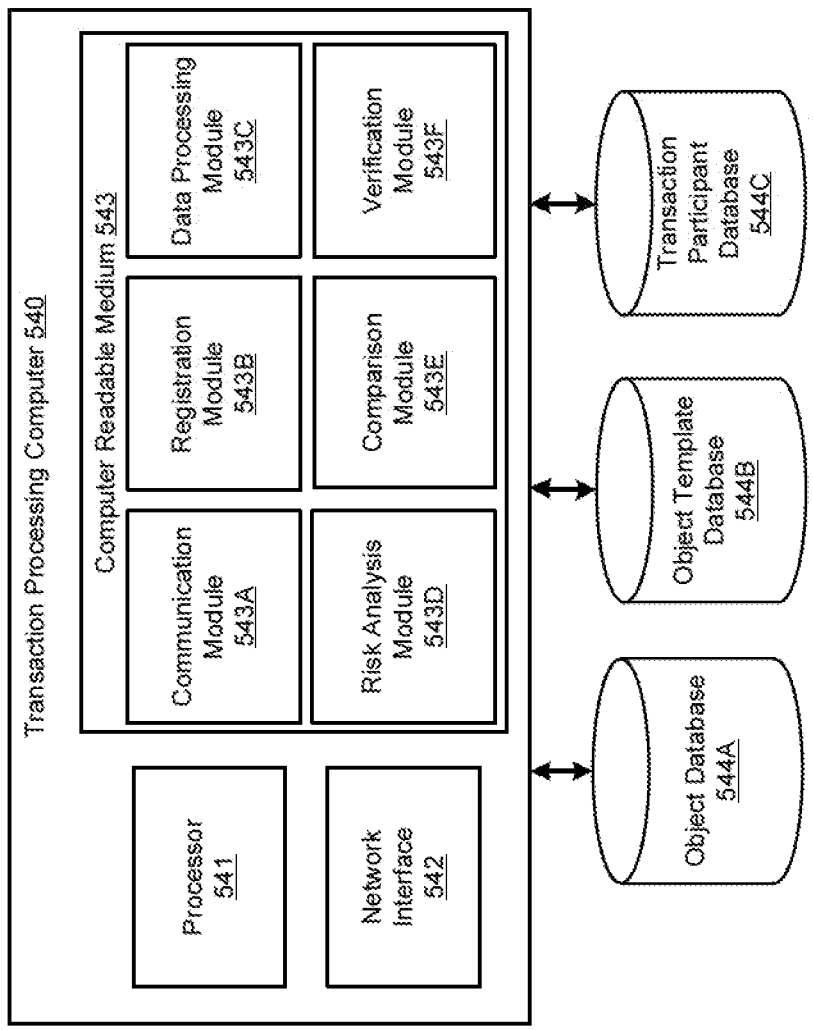
FIG. 5 shows a block diagram of a transaction processing computer according to an embodiment of the invention.

FIG. 5 shows a block diagram of a transaction processing computer according to an embodiment of the invention. Transaction processing computer 540 may be any processing computer or server computer configured to process data received in a transaction such as transaction processing computer 140 of FIG. 1. Transaction processing computer 540 may comprise a processor 541 for executing instructions or logic, a network interface 542 for sending and receiving messages over a network, and computer readable medium 543 for storing modules or code that may be used to initiate or perform tasks upon execution by processor 541.

Transaction processing computer 540 may further be coupled to object database 544A for storing and linking physical objects to user accounts. In some embodiments, a user may be able to register a physical object and link it to their account. This registration process may be through an out-of-band communication between the user and the transaction processing computer 540. For example, the user may be able to access a website associated with the transaction processing computer 540, and through the website the user may be able to submit images and/or metadata associated with a physical object, such as their portable device used to conduct a transaction. For example, if the portable device is a user's vehicle, the user may be prompted to use their mobile phone or similar mobile device with a camera to take images of their vehicle. The user could also collect metadata associated with the vehicle, such as providing the license plate number, VIN, and total miles driven of the vehicle into the website. Alternatively, the user could capture images of their license plate, VIN, or the total miles driven displayed on the odometer of the vehicle. The metadata could be uploaded, along with the images of the vehicle, to the transaction processing computer 540 through the website. The transaction processing computer 540 may then register that vehicle by associating the vehicle with the user's account in the object database 544A. In some embodiments, a user may be able to register multiple vehicles to their account.

In some embodiments, the images and the metadata associated with the registered objects may be stored in the object database 544A. In some embodiments, the transaction processing computer 540 may directly compare the images of a portable device taken during a transaction to the images of the physical objects registered to a user account stored in the object database 544A. If a comparison of the images results in a determination that the portable device is the same as the physical object registered to the user's account, that may suggest that the transaction was not likely to be fraudulent and the transaction processing computer 540 may pass that information along to the authorizing computer (e.g., through a verification status in the authorization request message). Furthermore, the metadata associated with the portable device that is collected during the transaction may also be compared to the metadata for the physical object obtained and stored during the registration process. The metadata comparison can also be used in the determination of the verification status and whether the transaction is fraudulent.

Transaction processing computer 540 may further be coupled to object template database 544B, which may be used to improve the speed that verification may be performed by the transaction processing computer 540. The object template database 44B may store templates associated with the physical objects that are associated with users. In some embodiments, the transaction processing computer 540 may perform additional processing such as feature extraction on images to allow the transaction processing computer 540 to compare distinct features of the portable device to distinct features of the registered physical objects. For example, a user may register a physical object such as their vehicle by uploading images of the vehicle. The transaction processing computer 540 may generate a 3D mapping of the physical object from those images, which can be further used to determine distinct features of the vehicle, such as the dimensions of the vehicle (length, width, height) or any other custom features. These features can be stored in a template for that physical object, which is stored in the template database 544B. Once a transaction takes place, the transaction processing computer 540 will receive images of a portable device as part of the authorization request message. The transaction processing computer 540 may then generate a 3D mapping of the portable device from those images, which can be used to determine the distinct features of that vehicle. A feature comparison may then be performed between the portable device presented by the user for the transaction and the registered physical object for the user, which in this example would involve comparing the dimensions of the vehicle presented by the user for the transaction to the dimensions of the vehicle that the user registered to their account.

Transaction processing computer 540 may be additionally coupled to transaction participant database 544C for storing and linking data relating to interacting users and resource providers such as associated account identifiers of a user and associated resource provider identifiers of a resource provider. In one embodiment, object database 544A, object template database 544B, and the transaction participant database 544C may comprise dedicated entries of a single database managed by transaction processing computer 540.

Computer readable medium 543 may comprise communication module 543A for instructing processor 541 to receive, format, and transmit data and/or messages according to embodiments of the invention. For example, communication module 543A may comprise code instructing transaction processing computer 540 to receive and reformat authorization messages that are communicatively exchanged through network interface 542. In some embodiments, the communication module 543A may further comprise code for identifying an authorizing computer based on at least a portion of an authorization request message (e.g., at least a portion of an account identifier). For example, an account identifier may be a 16-digit primary account number (PAN) and the transaction processing computer 540 may determine that the first 6 digits identifies a specific issuer or authorizing entity such as '469216—JP Morgan Chase.' Thus, the communication module 543A may dictate which authorizing computer the transaction processing computer 540 will route the authorization request message to. In some embodiments, the communication module 543A may comprise code instructing the transaction processing computer 540 to receive; parse, and/or identify, from the authorization request message, the runtime image captures and/or metadata associated with the portable device used in the transaction. In some of such embodiments, the images of the portable device may be further handled by the data processing module 543C in order to facilitate the comparison between distinct features of the portable device and the physical object registered to the user's account.

Computer readable medium 543 may comprise registration module 543B for instructing processor 541 to receive images and/or metadata of a physical object from a user and associate all that information for that physical object with a user account indicated by the user. For example, the registration module 543B may comprise code instructing transaction processing computer 540 to query the user for images and/or metadata for the physical object. The registration module 543B may further comprise code instruction transaction processing computer 540 to initiate further processing of those images, such as extracting data points and features from the images in order to create a template for the physical object that can be stored in the object template database 544B. Metadata associated with the physical object may be stored in the object template database 544A.

Computer readable medium 543 may comprise data processing module 543C for instructing processor 541 to perform pre-processing of images, generate 3D mappings from the images, perform data point and feature extraction from those mappings, and create templates to be stored in the object template database 5448B. For instance, the data processing module 543C may comprise code instructing transaction processing computer 540 take images for the portable device used in the transaction (obtained from the authorization request message) and generate a 3D mapping of the portable device from those images by taking slices or cross sections from those images. In the case that the portable device is a vehicle, a 3D mapping of that vehicle would be generated which can be used to determine the distinctive features of that vehicle, such as its dimensions or any other custom features. Those distinctive features can be placed into a template for the portable device. Similarly, a 3D mapping can be generated for the physical object registered to a user account, and the data points and features in that 3D mapping can be stored as a template for the registered physical object. In some embodiments, the comparison module 543E can be used to compare those templates for similarity.

Computer readable medium 543 may comprise risk analysis module 543D for instructing processor 541 to perform additional checks utilizing metadata associated with the portable device. For example, the risk analysis module 4330 may comprise code instructing transaction processing computer 540 to compare metadata for the portable device (collected for the transaction) to metadata for the physical object registered with the users account. As a more specific example, in the case where the portable device and the registered physical object are both vehicles, the transaction processing computer 540 may compare metadata for the vehicle presented at the transaction with the metadata for the vehicle on-file for the user initiating the transaction. As previously described, this may include comparing the license plate number, VIN, and total number of miles driven for the vehicle presented at the transaction with the license plate number, VIN, and total number of miles driven for the vehicle registered to the user's account. If the metadata between the portable device and the registered physical object sufficiently match, the transaction processing computer 540 may determine that the transaction is not likely to be fraudulent. In some embodiments, these additional checks utilizing metadata associated with the portable device may serve as additional security features for preventing fraudulent transactions. In some embodiments, whether these additional checks are performed may depend on whether the transaction value is a high amount or a low amount. For transactions with low value, the additional security may not be needed and the additional checks utilizing metadata may not need to be performed. For transactions with high value, the additional checks utilizing metadata may be performed in addition to the comparison of templates generated from the images.

In some embodiments, the risk analysis module 543D may instruct the transaction processing computer 540 to take into consideration additional metadata such as last reported time, as well as the currently reported time. For example, at the time of the transaction, the metadata collected for a vehicle may include a total number of miles traveled (e.g., 130,000 miles) and a timestamp (e.g., Jan. 30, 2016). The transaction processing computer 540 may also log metadata from previous transactions, which can be stored in the object database 544A. This may include metadata from the most-recent, previous transaction (or from registration, if there is no transaction history), such as last reported total number of miles traveled (e.g., 120,000 miles) and a last reported time (e.g., Jan. 1, 2016). The risk analysis module 543D may then take into account how many miles the car has been driven since the last reported time and use that information for making a determination regarding whether the transaction is fraudulent. For example, if the risk analysis module 543D determines that the 10,000 miles traveled in the last 30 days since the last reported time is possible, then the transaction is not likely to be fraudulent.

In some embodiments, the risk analysis module 433D may instruct processor 541 to assess the risk of a pending transaction and calculate a risk score based on predetermined rules and criteria. For example, risk analysis module 543D may comprise code that generates a risk score ranging from '0' to '100' by evaluating such factors as transaction amount, associated riskiness of resource provider identifier, associated riskiness of account identifier, time of day that transaction occurs, location of transaction, how similar the image template of the portable device is to the image template of a physical object registered to the user, how similar the metadata for the portable device is to the metadata of a physical object registered to the user, and so forth. The risk score may be added to the authorization request message in order to affect an authorization result determined by an authorizing computer or entity, or may be used to reject or authorize a transaction depending on predetermined preferences of the authorizing entity. This risk score may be sent in addition to, or in lieu of, a verification status to the authorizing computer. In some embodiments, the risk score may serve as a metric to convey to the authorizing computer how likely it is the transaction is fraudulent.

Computer readable medium 543 may comprise comparison module 543E for instructing processor 541 to compare the image templates for the portable device used in a transaction and the physical objects registered to the user in the transaction. For instance, the comparison module 543E may comprise code that instructs the transaction processing computer 540 to compare the template generated from the images of the portable device to one or more templates, generated from the images of the physical objects registered to a user's account. To make the comparison, the transaction processing computer 540 can compare data points and distinctive features (e.g., dimensions) between the portable device and the registered physical object and determine a matching percentage. For instance, the length of the portable device can be compared to the length of the registered physical object, the width of the portable device can be compared to the width of the registered physical object, and so forth. Thus, a feature comparison can be performed between the portable device and the registered physical object and any deviations may be identified. If the portable device is determined to be similar enough to the registered physical object beyond some threshold, the comparison module 543E may determine that the transaction is not likely to be fraudulent (e.g., the user is initiating the transaction with the same physical object that was registered by that user).

In some embodiments, the templates or data points used in the comparison may be hashed or fingerprinted in some manner. For instance, the various features of the portable device may be hashed into a single value that may be compared to a hashed value for the various features of the registered physical object. This may speed up the comparison and allow a single, hashed values to be compared rather than sets of values (e.g., vectors containing the various dimensions) between the portable device and the registered physical object. As previously described, the images used may be a 2D or a 3D image capture. However, the use of 3D images and contours may provide more data points and distinctive features that can be used for comparison purposes, which allows for stronger verification. This further protects the users from fraudulent transactions without compromising their privacy. In some embodiments, the comparison of images and templates through the comparison module 543E may involve the use of machine-learning algorithms. Accordingly, the accuracy and confidence of the comparisons may improve over time as more transactions are performed and become useable to train and improve those machine-learning algorithms.

Computer readable medium 543 may comprise verification module 543F for instructing processor 541 to modify the authorization request message sent to the authorizing computer with an indication of a verification result. For example, the transaction processing computer 540 may analyze the contents of the authorization request message in order to determine whether the transaction is likely to be fraudulent (e.g., by analyzing the image and/or metadata associated with the portable device used in the transaction). This determination was previously described in regards to the comparison module 543E and the risk analysis module 543D. The transaction processing computer 540 may forward the authorization request message to the authorizing computer, but the transaction processing computer 540 may add a verification status and/or a risk score to the authorization request message. For example, the transaction processing computer 540 may add a risk score calculated through the risk analysis module 543D to the authorization request message. The risk score may indicate how likely it is the transaction is fraudulent and may be used by the authorizing computer to reject or authorize a transaction depending on predetermined preferences of the authorizing entity. In some embodiments, the verification module 543F may add a verification status of either "verified" or "unverified" to the authorization request message in order to indicate whether the transaction is likely or not likely to be fraudulent.

Figure 6:
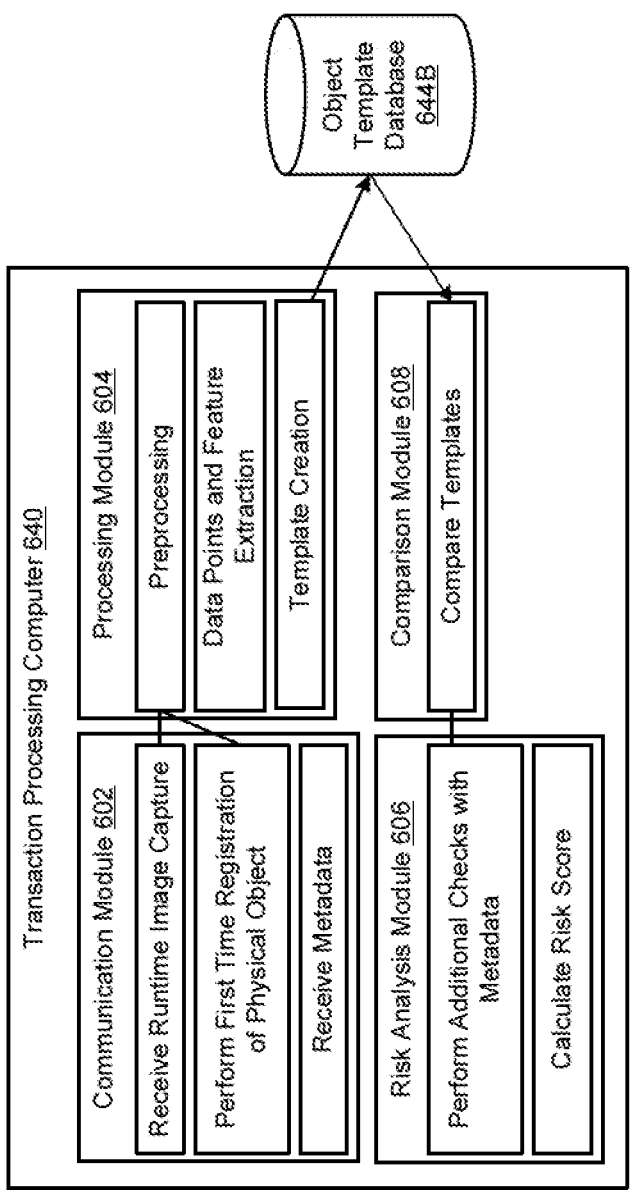
FIG. 6 shows a block diagram of a transaction processing computer according to an embodiment of the invention.

FIG. 6 shows a block diagram of a transaction processing computer according to an embodiment of the invention.

The transaction processing computer 640 shown in FIG. 6 is similar to the transaction processing computer 540 shown in FIG. 5. For the transaction processing computer 640, there is a communication module 602, a processing module 604, a risk analysis module 606, and a comparison module 608.

As seen in the figure, the communication module 602 may be configured for performing numerous tasks that include receiving runtime image captures, perform first time registration of a physical object, and receiving metadata. In some embodiments, the communication module 602 may perform the functionality of the communication module 543A and the registration module 543B shown in FIG. 5. For example, the communication module 602 may be configured to perform first time registration of a physical object by receiving images and/or metadata of a physical object from a user, and associating all that information for that physical object with a user account indicated by the user. The communication module 602 may also be configured to receive runtime image captures and metadata for portable devices used to initiate transactions. For instance, the communication module 602 may be configured to receive, parse, and/or identify, from an authorization request message, the runtime image captures and/or metadata associated with the portable device used in the transaction.

The processing module 604 may be configured for preprocessing of image captures, the extraction of data points and features from the processed image captures, and template creation. In some embodiments, the processing module 604 may perform similar functionality as the data processing module 543C shown in FIG. 5. The processing module 604 may perform preprocessing of images, such as generating 3D mappings from the images received from runtime image capture or registration of a physical object. The processing module 604 may then perform data point and feature extraction from those mappings. For example, the processing module 604 may identify the dimensions of the portable device or the physical object, which can be used to generate a template. The templates for physical objects being registered can be stored in the object template database 644B.

The comparison module 608 may be configured for comparing generated templates for a portable device to templates for physical objects registered to the user account. In some embodiments, the comparison module 608 may have similar functionality as the comparison module 543E in FIG. 5. The comparison module 608 may be configured to compare the template of a portable device to the templates of any physical objects registered to the user account associated with the transaction. For example, the comparison module 608 may compare the distinctive features between the templates, such as comparing the dimensions of the portable device against the dimensions of the physical objects registered to the user account in order to determine a match or a high degree of similarity. If the portable device is determined to be similar enough to the registered physical object beyond some threshold, the comparison module 608 may determine that the transaction is not likely to be fraudulent (e.g., the user is initiating the transaction with the same physical object that was registered by that user).

The risk analysis module 606 may be configured for performing additional checks with metadata and calculating a risk score. In some embodiments, the risk analysis module 606 may have similar functionality as the risk analysis module 543D in FIG. 5. In many cases, the risk analysis module 606 may perform additional checks using metadata associated with the portable device. This can be done if the transaction amount is a high value, such that the additional security measure is needed. This can also be done if it is unclear whether the portable device matches the registered physical object, or if the portable device has common features that causes it to match with many different potential physical objects. For example, the user may present a vehicle for the portable device that has dimensions that are also the dimensions of numerous models/makes of vehicles. Thus, either more distinctive features would need to be compared or the metadata associated with the portable device can be compared. The risk analysis module 606 may be configured to compare metadata for the portable presented at the transaction with the metadata for the physical objects on-file for the user initiating the transaction. As previously described, this may include comparing the license plate number, VIN, and total number of miles driven for the vehicle presented at the transaction with the license plate number, VIN, and total number of miles driven for the vehicle registered to the user's account. In some embodiments, the risk analysis module 606 may calculate a risk score by evaluating factors as transaction amount, associated riskiness of resource provider identifier, associated riskiness of account identifier, time of day that transaction occurs, location of transaction, how similar the image template of the portable device is to the image template of a physical object registered to the user, how similar the metadata for the portable device is to the metadata of a physical object registered to the user, and so forth. The risk score may be added to the authorization request message in order to affect an authorization result determined by an authorizing computer or entity, or may be used to reject or authorize a transaction depending on predetermined preferences of the authorizing entity. In other words, the risk score may serve as a metric to convey to the authorizing computer how Likely it is the transaction is fraudulent.

Figure 7:
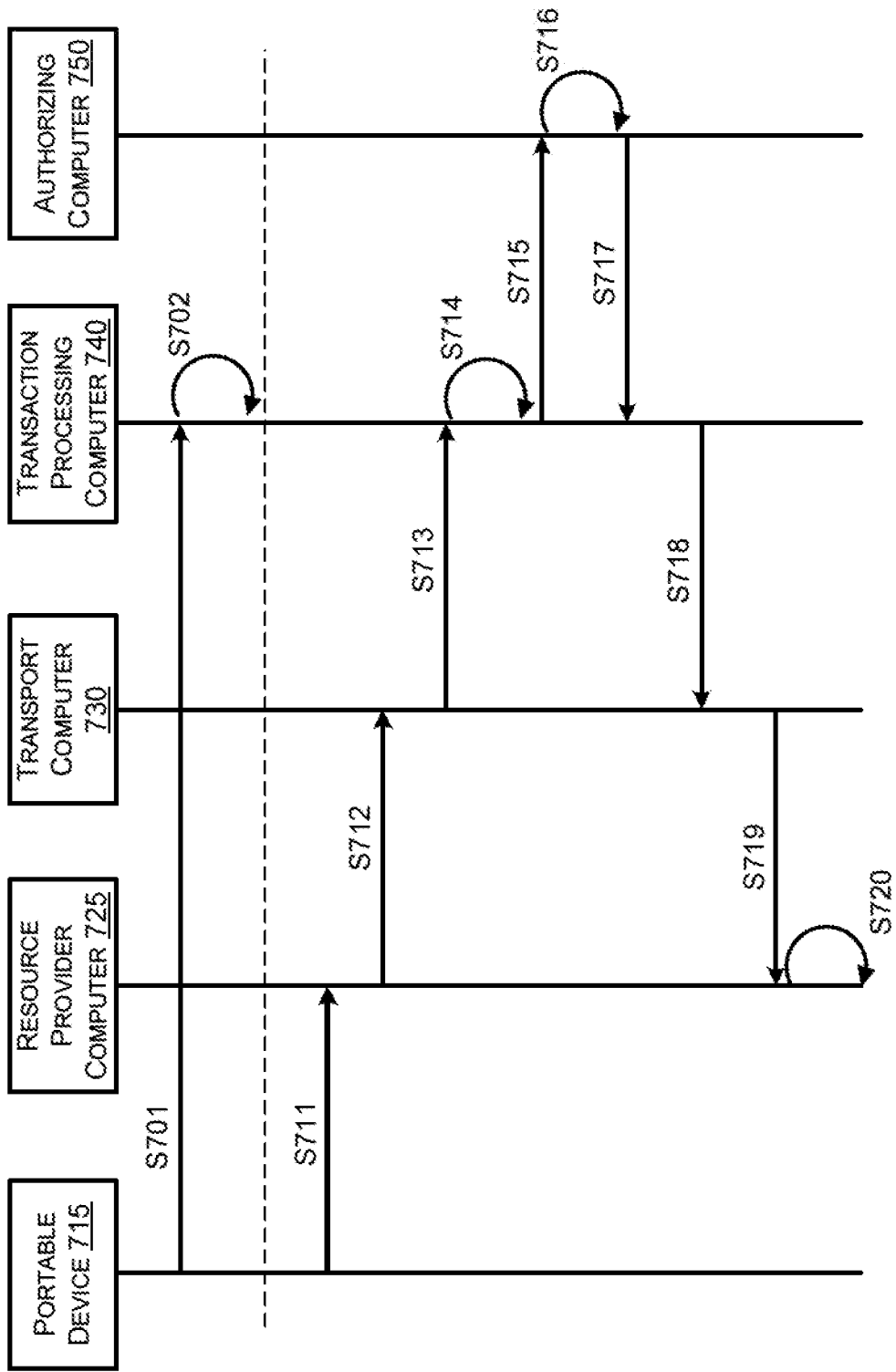
FIG. 7 shows a swim-lane diagram of a transaction flow according to an embodiment of the invention.

FIG. 7 shows a swim-lane diagram of a transaction flow according to an embodiment of the invention. Process 700 may be cooperatively executed by a user in possession of a portable device 715, the resource provider computer 725, transport computer 730, transaction processing computer 740, and authorizing computer 750, which may be the similar to the corresponding entities of FIG. 1. Resource provider computer 725 may be the combination of the access device 120 and the resource provider computer 125 in FIG. 1.

According to the embodiments of the invention, the user may first seek to register the portable device 715, which may be a physical object such as a vehicle with remote communication capabilities. At S701, the user may perform an out-of-band registration of the portable device 715 with the transaction processing computer 740. The user may supply an account identifier associated with their user account, so that the transaction processing computer 740 may associate the portable device 715 with their user account. The user may use a second device, such as a mobile device equipped with a camera, to take images of the portable device 715 to send to the transaction processing computer 740. In some embodiments, the images may be 2D images. In some embodiments, the images may be 3D images. These 3D images can be captured using any suitable device, including normal cameras with enhanced software (e.g., Microsoft Kinect), confocal microscopes, 3D ultrasound equipment, and so forth. The use of 3D images may enable representation of governing equations and data points for the portable device 715 in all 3 axes, which allows for accurate results to be achieved when those 3D images are compared.

At S701, the user may also provide the transaction processing computer 740 with metadata associated with the portable device 715. For instance, the portable device 715 may be a vehicle and the user may provide additional contextual information such as the license plate number, vehicle identification number (VIN), an odometer reading of the total number of miles driven, the reported time of that odometer reading, and so forth. In some embodiments, this additional contextual information may be captured by the camera along with the image of the vehicle itself. For instance, the camera can be used to capture an image of the odometer reading, the rear license plate, the VIN stamped on the vehicle, and so forth. In some embodiments, the additional contextual information may be supplied by the user. For example, the user may manually enter those fields to provide them to the transaction processing computer 540. There may also be additional information, such as a Car Verification Value, usable to distinguish similar cars (e.g., same model and make) that may not be captured by the camera but can be provided during registration. This additional information may serve as additional context when needed.

At S702, the transaction processing computer 740 may carry out the registration process to associate the physical object (e.g., portable device 715) with the account of the user. The metadata associated with the portable device 715 may be saved in a database, such as object database 744A. The metadata for the portable device 715 may be linked to the user's account in the database, such as through an account identifier. For example, the account identifier for the user's account may be used to look up all of the metadata for the physical objects (including portable device 715) that have been registered to the user's account.

The transaction processing computer 740 may also perform processing of the images of the portable device 715 received in the registration process. For example, the transaction processing computer 740 may create a 3D mapping of the portable device 715 from the image, which may include 3D planar cross-sections of the image of the portable device 715. These cross-sections can be used to identify and process specific cross sections of the image of the portable device 715. These specific cross sections can further be used to identify data points and extract distinctive features of the portable device 715. For instance, with a 3D mapping of the portable device 715 obtained from the image, the transaction processing computer 740 may be able to determine the dimensions (e.g., length, width, and height) of the portable device 715. For a vehicle, these dimensions may be distinctive for the make and model of that vehicle.

The transaction processing computer 740 may also perform processing of the images of the portable device 715 received in the registration process. For example, the transaction processing computer 740 may create a 3D mapping of the portable device 715 from the image, which may include 3D planar cross-sections of the image of the portable device 715. These cross-sections can be used to identify and process specific cross sections of the image of the portable device 715. These specific cross sections can further be used to identify data points and extract distinctive features of the portable device 715. For instance, with a 3D mapping of the portable device 715 obtained from the image, the transaction processing computer 740 may be able to determine the dimensions (e.g., length, width, and height) of the portable device 715. For a vehicle, these dimensions may be distinctive for the make and model of that vehicle. These data points and extracted features may be used to create a template for the portable device 715 that can be stored in a database, such as the object template database 544B. In some embodiments, the template for the portable device 715 may be associated with the user account (e.g., via an account identifier) within the object template database 544B. Any templates for the various physical objects registered to and associated with the user account may be looked up in the database using the account identifier. In some embodiments, the template may include the 3D mapping of the portable device 715. In some embodiments, the template may include a vector of the data points and extracted features for the portable device 715. In some embodiments, the template may include a hash value based on the data points and extracted features for the portable device 715. After the transaction processing computer 740 has created a template for the portable device 715 and stored metadata associated with the portable device 715, the registration process may be complete.

At S711, the user may attempt to initiate a transaction. The user may present the portable device 715 to the resource provider computer 725. For example, if the portable device 715 is a vehicle the user may drive the vehicle into the vicinity of the resource provider computer 725 (or at least an access device). To conduct the transaction, the user may inform or make a request to the resource provider computer 725 as to the resources the user wishes to gain access to. For example, the user may select a number of items for purchase and may inform the resource provider computer 725 that the user is ready to "checkout" by selecting a checkout icon on a merchant website or by physically presenting the items to an employee operating the resource provider computer 725. The portable device 715 may provide the resource provider computer 725 with an account identifier (e.g., a token) associated with a user account associated with the portable device 515. For example, the portable device 715 could be a vehicle with remote communication capabilities that electronically transmits a token to the resource provider computer 725. That token may be used by the transaction processing computer 740 to determine the user account associated with the portable device 715, which can be used to lookup the various images, templates, and metadata for the physical objects registered to the user account.

The resource provider computer 725 may take images of the portable device 715 to send to the transaction processing computer 740. These images may be 2D images or 3D images, captured using any suitable imaging device. For example, the resource provider computer 725 may have a camera with enhanced software for taking images of the portable device 715. Alternatively, the user could take images of the portable device 715 through a secondary device, such as a mobile phone, and then submit those images to the resource provider computer 725. The use of 3D images may enable representation of governing equations and data points for the portable device 715 in all 3 axes, which allows for accurate results to be achieved when those 3D images are processed and compared.

At S711, the user may also provide the resource provider computer 725 with metadata associated with the portable device 715. For instance, the portable device 715 may be a vehicle and the user may provide additional contextual information such as the license plate number, vehicle identification number (VIN), an odometer reading of the total number of miles driven, the reported time of that odometer reading, and so forth. In some embodiments, the additional contextual information may be supplied directly by the user. For example, the user may manually enter those fields in their mobile phones (e.g., the odometer reading is 130,000 miles) to submit to the resource provider computer 725. In some embodiments, this additional contextual information may be captured by the camera along with the image of the vehicle itself. For instance, the camera can be used to capture an image of the odometer reading, the rear license plate, the VIN stamped on the vehicle, and so forth. In some embodiments, the portable device 715 may be configured to communicate this information directly to the resource provider computer 725. For example, the portable device 715 may be a vehicle with connected car capabilities that is capable of sending the contextual information directly to the resource provider computer 725. In some embodiments, the portable device 715 may be configured to interface with the resource provider computer 725 to provide that additional context information. For instance, the resource provider computer 725 may have one or more sensors for collecting that information. The resource provider computer 725 may have a plug or adaptor that may be inserted into the OBD II port of the vehicle in order to collect that metadata.

At S712, resource provider computer 725 may collect relevant transaction data for an authorization request message send to the transport computer 730. For example, the portable device 715 may be a vehicle having distinctive features (e.g., make, model, dimensions). The images of the portable device 715 collected by the resource provider computer 725 may be collected, along with any metadata associated with the portable device 715 (e.g., license plate number, vehicle identification number (VIN), the number of total miles driven with the vehicle, and so forth). This information may be collected with other transaction information, such as the account identifier of the user account, the transaction amount, merchant identifier, merchant location, etc., as well as any other information that may be utilized in determining whether to identify and/or authorize a transaction. The authorization request message may also include other information such as information that identifies the resource provider computer 725 that generated the authorization request message. Thus, the authorization request message may include any information associated with the current transaction, as well as the images, metadata, or contextual data associated with the portable device 715 used to conduct the transaction.

At S713, the transport computer 730 may receive the authorization request message and forward that message to the transaction processing computer 740.

At S714, the transaction processing computer 740 may receive the authorization request message and perform a verification analysis based on the transaction data in the authorization request message. For example, the transaction processing computer 740 may read the information stored in the received authorization request message (e.g., the images and metadata associated with the portable device 715) and may analyze that information in order to determine whether the portable device 715 is a physical object that was previously registered and associated with the user. For example, the transaction processing computer 740 may generate a template from the images associated with the portable device 715 and compare it against the templates for the registered physical objects that were previously associated with the user account (which is identifiable from the account identifier). In some embodiments, the templates can be compared for similarity. In some embodiments, the data in the templates can be hashed into single values which are compared. The templates for the registered physical objects can be looked up in the database (e.g., the object template database) with the user account and account identifier.

The transaction processing computer 740 may also perform the verification analysis using the metadata associated with the portable device 515 from the authorization request message. In some embodiments, the transaction processing computer 740 may compare the metadata for the portable device 715 against the metadata for the registered physical objects that were previously associated with the user account. The metadata for the registered physical objects can be looked up in the database (e.g., the object database) with the user account and account identifier. For example, the transaction processing computer 740 may take the license plate number for the portable device 715 and compare it to the license plate number on file for physical objects that are registered to the user account. A match or a high degree of similarity may indicate that the portable device 715 is one of the physical objects that the user registered with the transaction processing computer 740 and the transaction is not likely to be fraudulent. This comparison may be similarly performed with other metadata, such as the VIN. In some embodiments, there may be further logic involved when comparing odometer readings and timestamps/locations of those readings. For example, the transaction processing computer 740 may calculate high scores based on last location reported, current location reported, and verify if the odometer reading seems logical with time noted. As a more specific example, the transaction processing computer 740 may determine from the last location reported that a previous transaction took place two weeks ago at a location 1,000 miles away. Since that last transaction, the odometer reading has increased only 500 miles away. The transaction processing computer 740 may determine that it is not possible or likely that the vehicle moved 1,000 miles while the odometer reading only increased by 500 miles, which may suggest that the transaction is fraudulent.

In most cases, the image-based comparisons (e.g., of 3D captured templates) may be used to calculate risk or fraudulent activity based on different models/types of vehicles, customizations associated with the vehicles, etc. However, in cases where there are similar vehicles (e.g., the vehicle portable device 715 is very similar to the vehicles registered to the user account), additional parameters or contextual information may be needed in order to definitively discern between the two vehicles. For instance, the transaction processor computer 740 may need to take into account metadata such as odometer reading, the last reported location/time (sent to the resource provider computer through WiFi, LiFi or NFC), and so forth. In that case, both the 3D capture and the metadata can be used to calculate the risk associated with the transaction.

At S715, the transaction processing computer 740 may modify the authorization request message and forward it to the authorizing computer 750. For example, the transaction processing computer 740 may calculate a risk score based on factors such as transaction amount, associated riskiness of resource provider identifier, associated riskiness of account identifier, time of day that transaction occurs, location of transaction, how similar the image template of the portable device is to the image template of a physical object registered to the user, how similar the metadata for the portable device is to the metadata of a physical object registered to the user, and so forth. The risk score may be indicative of how likely the transaction is to be fraudulent, and the risk score may be added to the authorization request message in order to affect an authorization result determined by the authorizing computer 750, or may be used to reject or authorize a transaction depending on predetermined preferences of the authorizing computer 750. In some embodiments, the transaction processing computer 740 may add a verification status, such as "verified" or "unverified" to the authorization request message in order to indicate whether the transaction is likely or not likely to be fraudulent based on the results of the analysis performed at S714.

At S715, the transaction processing computer 740 may modify the authorization request message and send it to the authorizing computer 750. For example, the transaction processing computer 740 may calculate a risk score based on factors such as transaction amount, associated riskiness of resource provider identifier, associated riskiness of account identifier, time of day that transaction occurs, location of transaction, how similar the image template of the portable device is to the image template of a physical object registered to the user, how similar the metadata for the portable device is to the metadata of a physical object registered to the user, and so forth. The risk score may be indicative of how likely the transaction is to be fraudulent, and the risk score may be added to the authorization request message in order to affect an authorization result determined by the authorizing computer 750, or may be used to reject or authorize a transaction depending on predetermined preferences of the authorizing computer 750. In some embodiments, the transaction processing computer 740 may add a verification status, such as "verified" or "unverified" to the authorization request message in order to indicate whether the transaction is likely or not likely to be fraudulent based on the results of the analysis performed at S714.

At S716, the authorizing computer 750 may receive the authorization request message and determine an authorization result (e.g., 'authorized' or 'not authorized'). Authorizing computer 750 may determine the authorization result by, for example, comparing the transaction amount to data relating to the account identifier such as remaining balance of the user's account. Authorizing computer 750 may determine the authorization result based on any number of predetermined criteria including, but not limited to, the verification status and/or the risk score determined by the transaction processing computer 740. The authorizing computer 750 may indicate the authorization result in an authorization response message. The authorizing computer 750 may also indicate a reason or justification for the authorization result in the authorization response message, such as that the images for the portable device 715 did not match the images for the physical objects registered to the user account.

At S717, the authorizing computer 750 may send the authorization response message to transaction processing computer 740.

At S718, the transaction processing computer 740 may then send the authorization response message to transport computer 730, which may forward the authorization response message to resource provider computer 725 in S719.

At S720, the resource provider computer 725 may receive the authorization response message and may determine an appropriate action based on the data contained therein. For example, resource provider computer 725 may receive an authorization response message containing an authorization result of 'authorized', and resource provider computer 725 may be configured with logic instructing the resource provider computer 725 to notify the user that the transaction has been authorized and is successfully completed. In some embodiments, the resource provider computer 725 may notify the user through a display on the access device or through the user's mobile device. In another example, the resource provider computer 725 may receive an authorization response message containing an authorization result of 'not authorized', and the resource provider 725 may be configured with logic instruction the resource provider computer 725 to notify the user that the transaction was not authorized, such as through a display on the access device or through the user's mobile device. If the authorizing computer 750 indicated a reason or justification for the authorization result, such as that the images for the portable device 715 did not match the images for the physical objects registered to the user account, the resource provider 725 may initiate an action corresponding to that reason. For example, the resource provider 725 may notify the user that the images did not match and suggest to the user that the user attempt the transaction again after re-positioning the portable device 715 or fixing the imaging quality.

Figure 8:
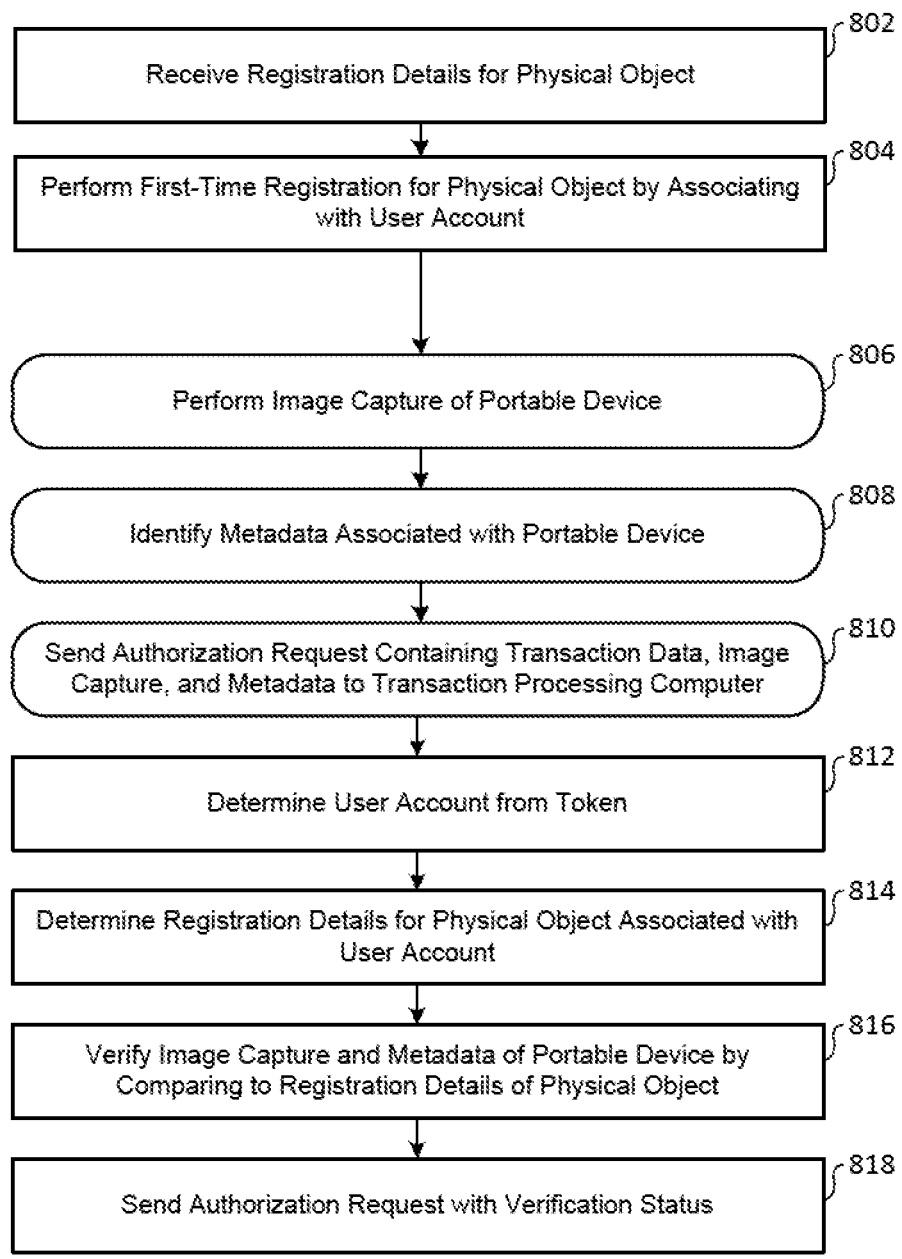
FIG. 8 shows a flow chart according to an embodiment of the invention.

FIG. 8 shows a flow chart according to an embodiment of the invention.

At block 802, the transaction processing computer will receive registration details for a physical object. In some embodiments, the transaction processing computer will receive image captures of the physical object along with metadata associated with the physical object. The transaction processing computer may also receive an account identifier of a user account to associate with all this information for the physical object. In some embodiments, a user will submit this information for the physical object, such as through a web page or software running on their mobile device. In some embodiments, the physical object will be the user's vehicle.

At block 804, the transaction processing computer will perform first-time registration for the physical object by associating all of the information for the physical object with the user's account. For example, the metadata associated with the physical object may be saved in a database and linked to the user's account in the database, such as through an account identifier. The account identifier can then be used to look up all of the metadata for any of the physical objects that have been associated with the user's account (there may be more than one physical object if the user decides to register multiple objects). The transaction processing computer may also perform processing of any image captures received of the physical object. In some embodiments, the transaction processing computer may create a 3D mapping of the physical object from the images, which can be used in order to identify data points and extract distinctive features of the physical object. In some embodiments, the transaction processing computer may be able to use this information in order to determine what the physical object is. For example, the transaction processing computer may be able to access a database with the information for the distinctive features for many kinds of physical objects and determine which object in the database best matches the physical object being registered. In other words, if the physical object being registered was a vehicle, the transaction processing computer could determine the dimensions of the vehicle and compare it to the known dimensions of many different types of vehicles, which could be stored in a database. If matches are found, the transaction processing computer could either determine the best match or present the matches to the user in order to select the best match. In some embodiments, the image captures, mappings, or any processing outputs associated with the physical object may be saved in a database and linked to the user's account in the database, such as through an account identifier.

After the user registers one or more physical objects to their account, the user may wish to perform a transaction. In order to perform the transaction, the user will need to use the physical object that the user previously registered. In some cases, this object being used, in the transaction is referred to as a portable device, since the user will likely need to move it to an access device or resource provider computer in order to initiate the transaction. If the portable device is the same as the physical object that the user previously registered to their account, then the transaction should be authorized. If the user instead brings a portable device that is not the same as a physical object that the user has registered, then the transaction is likely to fail. Accordingly, the user may bring the portable device into proximity of the access device or resource provider computer and initiate the transaction. The user may be prompted to supply an image capture of the portable device, as well as any metadata associated with the portable device. That information will be used to compare against the registration information on-file for the physical objects registered to the users account in order to determine if the portable device is a registered physical object.

At block 806, the access device or resource provider computer may perform an image capture of the portable device. In some embodiments, there may be an imager component or imager device (e.g., a camera) that is in electronic communication with the access device or resource provider computer. A signal can be sent to the imager to automatically capture images of the portable device when the transaction is initiated. In some embodiments, the image captures may need to be supplied by the user. For example, the user may capture images of the portable device on their mobile device, and those images can be sent from the mobile device to the access device or resource provider computer.

At block 808, the access device or resource provider computer may identify metadata associated with the portable device. In some embodiments, there may be an sensor component or device that is in electronic communication with the access device or resource provider computer. The sensor component may be configured to identify and collect metadata associated with the portable device. In some embodiments, the sensor component may be the imager or similar to the imager, such as when the metadata can be obtained through the image capture (e.g., using image processing to determine the license plate number from an image capture of a vehicle's rear). In some embodiments, the sensor component may be tailored to collecting metadata from a type of object. For example, if the portable device presented by the user is expected to be a vehicle, the sensor may be a device capable of interfacing with a vehicle to obtain metadata stored by the vehicle. As a more specific example, modern vehicles often store information such as the total number of miles traveled in an on-board computer. In some cases, the vehicle's on-board computer or in-vehicle entertainment unit may be able to electronically communicate the number of miles traveled to the sensor, such as through a wireless signal. Alternatively, the sensor could include an adapter for the vehicle's OBD-II port and the total number of miles traveled could be obtained through the CAN bus. In some embodiments, the user attempting the transaction may need to provide the metadata associated with the portable device. For example, the user could enter the metadata (license plate number, total number of miles traveled, etc.) into the access device or resource provider computer, or the user could supply it through their mobile device to send to the access device or resource provider computer.

At block 810, the access device or resource provider computer may send an authorization request message to a transaction processing computer. The authorization request may contain, or be sent alongside, various kinds of information that includes transaction data, any image captures of the portable device, and any metadata associated with the portable device. In some embodiments, the image captures and the metadata may be considered as part of the transaction data. In some embodiments, the transaction data may include a transaction amount, a transaction time, and/or an account identifier associated with the transaction. In some of such embodiments, the account identifier may be a token. The token may be usable in order to determine a user account associated with the transaction and to look up any physical objects that have been registered under the user account.

At block 812, the transaction processing computer may determine a user account from the token.

At block 814, the transaction processing computer may determine the registration details for any physical objects that have been registered to the user account. There may be one or more physical objects that have been registered, and the registration details for each physical object may include image captures and mappings, extracted data points and features, any object templates, any metadata associated with the physical object, and so forth. If all of this information is stored in a database, the transaction processing computer may be able to look up the appropriate information using the user account or account identifier from the transaction data.

At block 816, the transaction processing computer may determining if the portable device is a registered physical object for the user by verifying the image capture and metadata associated with the portable device. The image capture and metadata associated with the portable device can be compared to the registration information for any physical objects associated with the user, using any of the previously described methods. The verification process may include determining a verification status, which may be based on how likely it is that the portable device the user presented at the transaction matches a physical object that is registered to the user. The verification process may include determining a risk score, which may be partially based on how like the portable device matches a physical object registered to the user. The risk score may be indicative of how likely the transaction is fraudulent, and it may take into account additional inputs such as the transaction amount, transaction time, transaction location, and so forth.

At block 818, the transaction processing computer may send the authorization request message to the authorizing computer in order to authorize the transaction. The transaction processing computer may also send the verification status and/or risk score with the authorization request message, or the verification status and/or risk score may be added to the authorization request message.

Additional Implementation Details

Specific details regarding some of the above-described aspects are provided above. The specific details of the specific aspects may be combined in any suitable manner without departing from the spirit and scope of embodiments of the invention.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications; publications, and descriptions mentioned above are herein incorporated by reference in their entirety for all purposes. None is admitted to be prior art.

What is claimed is:

1. A computer-implemented method, comprising:
   receiving, by an access device, a transaction request from a portable device to initiate a transaction, the transaction request comprising an account identifier associated with a user account associated with the portable device;
   receiving, by the access device, a plurality of two-dimensional images of the portable device;
   determining, by the access device, image data for the plurality of two-dimensional images of the portable device; and
   providing, by the access device, the image data, a set of metadata associated with the portable device, and the account identifier to a transaction processing computer;
   verifying, by the transaction processing computer, the image data by creating a 3D mapping using the image data formed from the plurality of two-dimensional images, identifying distinct features of the portable device using the 3D mapping, and comparing the 3D mapping and the distinct features against a registered template of the portable device that was previously registered with the transaction processing computer using a machine learning algorithm;
   updating, by the transaction processing computer, the machine learning algorithm based on a result of the comparing of the 3D mapping and the distinct features against the registered template of the portable device;
   verifying, by the transaction processing computer, the set of metadata associated with the portable device by comparing the set of metadata to a set of metadata associated with the portable device registered to the user account;
   determining, by the transaction processing computer, a risk score at least partly based on both the verification of the image data for the plurality of two-dimensional images of the portable device and the verification of the set of metadata associated with the portable device; and
   transmitting, by the transaction processing computer, an authorization request message comprising the risk score requesting authorization of the transaction to an authorizing computer, which authorizes or does not authorize the transaction based on the contents of the authorization request message, and if the transaction is authorized the authorizing computer transmits an authorization response message to a resource provider computer indicating that the transaction is authorized, and if the transaction is not authorized the authorizing computer transmits an authorization response message to the resource provider computer indicating that the transaction is not authorized.

2. The computer-implemented method of claim 1, wherein the image data comprises 3D image data.

3. The computer-implemented method of claim 1, wherein the access device comprises a camera configured to capture the plurality of two-dimensional images of the portable device.

4. The computer-implemented method of claim 1, wherein the portable device is a vehicle.

5. The computer-implemented method of claim 4, wherein the set of metadata associated with the vehicle includes one or more of: a license plate number, a vehicle identification number (VIN), a number of miles the vehicle has been driven, and a timestamp.

6. The computer-implemented method of claim 1, wherein the account identifier is a token.

7. The computer-implemented method of claim 1, wherein the image data of the portable device comprises a set of 3D planar cross-sections.

8. The computer-implemented method of claim 1, wherein the access device comprises a sensor configured to interface with the portable device to obtain a metadata item associated with the portable device.

9. A system comprising:
   an access device, comprising
   a first processor,
   a network interface, and
   a first non-transitory computer-readable memory storing a set of instructions configured to be executed to instruct the first processor to:
     receive a transaction request from a portable device to initiate a transaction, the transaction request comprising an account identifier associated with a user account associated with the portable device,
     receive a plurality of two-dimensional images of the portable device,
     determine image data for the plurality of two-dimensional images of the portable device, and
     provide the image data, a set of metadata associated with the portable device, and the account identifier to a transaction processing computer; and
   the transaction processing computer, the transaction processing computer comprising:
     a second processor, and
     a second non-transitory computer readable memory storing instructions configured to be executed by the second processor to:
       verify the image data by creating a 3D mapping using the image data formed from the plurality of two-dimensional images, identifying distinct features of the portable device using the 3D mapping, and comparing the 3D mapping and the distinct features against a registered template of the portable device that was previously registered with the transaction processing computer using a machine learning algorithm,
       update the machine learning algorithm based on a result of the comparing of the 3D mapping and the distinct features against the registered template of the portable device,
       verify the set of metadata associated with the portable device by comparing the set of metadata to a set of metadata associated with the portable device registered to the user account;
       determine a risk score at least partly based on both the verification of the image data for the plurality of two-dimensional images of the portable device and the verification of the set of metadata associated with the portable device; and transmit an authorization request message requesting authorization for the transaction to an authorizing computer, which authorizes or does not authorize the transaction based on the contents of the authorization request message, and if the transaction is authorized the authorizing computer transmits an authorization response message to a resource provider computer indicating that the transaction is authorized, and if the transaction is not authorized the authorizing computer transmits an authorization response message to the resource provider computer indicating that the transaction is not authorized.

10. The system of claim 9, wherein the image data comprises 3D image data.

11. The system of claim 9, wherein the access device comprises a camera configured to capture an image of the portable device.

12. The system of claim 9, wherein the portable device is a vehicle.

13. The system of claim 12,
wherein the set of metadata associated with the vehicle includes one or more of: a license plate number, a vehicle identification number (VIN), a number of miles the vehicle has been driven, and a timestamp.

14. The system of claim 9, wherein the account identifier is a token.

15. The system of claim 9, wherein the image data comprises a set of 3D planar cross-sections.

16. The system of claim 9, wherein the access device further comprises a sensor configured to interface with the portable device to obtain a metadata item associated with the portable device.

17. A computer-implemented method, comprising:
receiving, by a transaction processing computer, a set of data associated with a transaction, wherein the set of data associated with the transaction includes:
image data for a plurality of two-dimensional images of a portable device, the image data formed from the plurality of two-dimensional images of the portable device;
an account identifier associated with a user account associated with the portable device; and
a set of metadata associated with the portable device;

verifying, by the transaction processing computer, the image data for the plurality of two-dimensional images of the portable device by creating a 3D mapping using the image data formed from the plurality of two-dimensional images, identifying distinct features of the portable device using the 3D mapping, and comparing the 3D mapping and the distinct features against a registered template of the portable device that was previously registered with the transaction processing computer using a machine learning algorithm;

updating the machine learning algorithm based on a result of the comparing of the 3D mapping and the distinct features against the registered template of the portable device;

verifying, by the transaction processing computer, the set of metadata associated with the portable device by comparing the set of metadata to a set of metadata associated with the portable device registered to the user account;

determining, by the transaction processing computer, a risk score at least partly based on both the verification of the image data for the plurality of two-dimensional images of the portable device and the verification of the set of metadata associated with the portable device; and transmitting, by the transaction processing computer, an authorization request message containing the risk score and requesting authorization for the transaction to an authorizing computer, which authorizes or does not authorize the transaction based on the contents of the authorization request message, and if the transaction is authorized the authorizing computer transmits an authorization response message to a resource provider computer indicating that the transaction is authorized, and if the transaction is not authorized the authorizing computer transmits an authorization response message to the resource provider computer indicating that the transaction is not authorized.

18. The computer-implemented method of claim 17, wherein the portable device is a vehicle.

19. The computer-implemented method of claim 17, wherein the portable device registered to the user account is a vehicle.

20. The computer-implemented method of claim 17, wherein the account identifier is a token.

* * * * *